United States Patent [19]
Manrique et al.

[11] Patent Number: 5,577,865
[45] Date of Patent: Nov. 26, 1996

[54] PLACEMENT OF A SUBSTANTIALLY NON-FLOWABLE CEMENTITIOUS MATERIAL IN AN UNDERGROUND SPACE

[75] Inventors: Jorge E. Manrique, The Woodlands, Tex.; Rodney L. Paugh, Lost Creek; Richard L. Moody, Weston, both of W. Va.

[73] Assignee: Halliburton Company, Duncan, Okla.

[21] Appl. No.: 508,356

[22] Filed: Jul. 28, 1995

[51] Int. Cl.$^6$ .............................. E02D 15/00; E02D 29/00
[52] U.S. Cl. .......................... 405/266; 106/819; 106/823; 106/DIG. 1; 405/267
[58] Field of Search .................................. 405/266, 267; 588/250; 106/819, 823, DIG. 1; 366/1, 3

[56] References Cited

U.S. PATENT DOCUMENTS

| | | | |
|---|---|---|---|
| 3,593,799 | 7/1971 | Boughton et al. | 166/295 |
| 4,174,226 | 11/1979 | Fitzpatrick et al. | 366/1 X |
| 4,257,814 | 3/1981 | Kellet et al. | 405/267 X |
| 4,618,376 | 10/1986 | Saternus et al. | 106/DIG. 1 X |
| 5,141,365 | 8/1992 | Smart | 405/267 |
| 5,263,797 | 11/1993 | Lindstrom et al. | 405/266 |
| 5,322,389 | 6/1994 | Smith | 405/128 |
| 5,419,632 | 5/1995 | Stephens | 366/3 |

*Primary Examiner*—George A. Suchfield
*Attorney, Agent, or Firm*—Craig W. Roddy

[57] ABSTRACT

Method of admixing and placing a substantially non-flowable cementitious material into an underground space, such as a mine shaft or the like. In a preferred embodiment, a cement slurry including about 95% Class F fly ash and about 5% hydraulic cement is admixed with an activator using a high intensity mixer to form a substantially non-flowable cementitious material, wherein the substantially non-flowable material is pumped through a conduit and placed into the underground space. The cementitious material does not flow away from the area of placement.

20 Claims, 1 Drawing Sheet

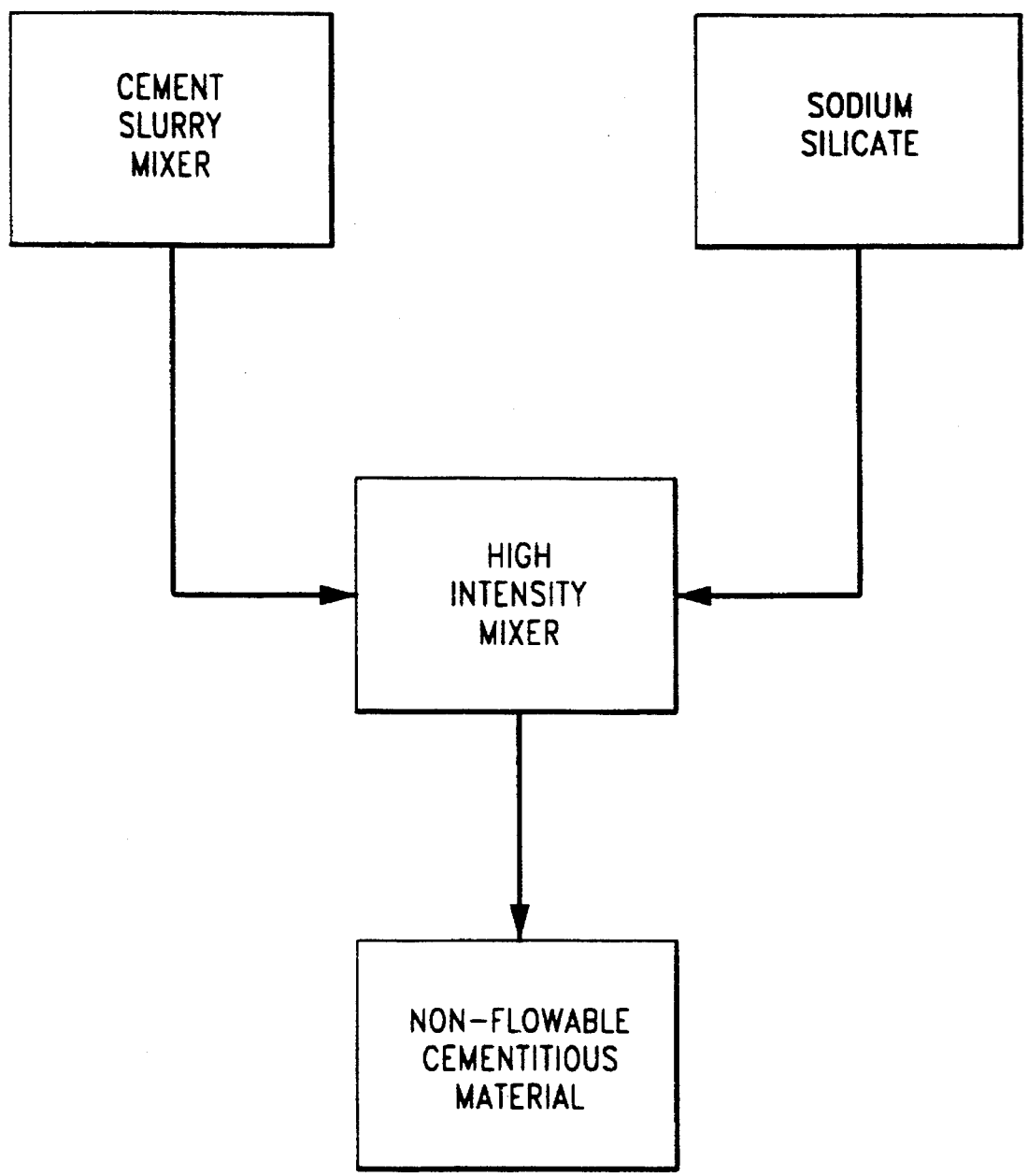

PLACEMENT OF A SUBSTANTIALLY NON-FLOWABLE CEMENTITIOUS MATERIAL IN AN UNDERGROUND SPACE

BACKGROUND OF THE INVENTION

1. Field of the Invention

The present invention relates generally to placement of substantially non-flowable cementitious material in an underground space, and more particularly, to methods of admixing and placing the substantially non-flowable cementitious material into an underground space, such as a mine shaft or the like.

2. Description of the Prior Art.

Cementitious materials, such as API cements and blends of API cements with fly ash, such as "POZMIX®" cement, are widely used in the industry. These materials are typically pumped in a liquid state and designed to flow and to harden after placement. Cement slurry is often used in wellbores to protect fresh water zones from hydrocarbons and/or brine water contamination, to isolate hydrocarbon bearing formations, and to protect tubular goods from corrosive gas and fluids. Furthermore, it is desirable to use cementitious materials for plugging abandoned underground spaces, such as mine shafts or the like.

Current methods of placing flowable cementitious materials in underground spaces, such as mine shafts, are inefficient and uneconomical because the flowable material is often wasted by entry into vugular porosity, natural fractures, weak formations, and other undesired areas. Typically, an excess volume of cement slurry is calculated without certainty that the calculated fill up volume will be accurate. Therefore, due to the waste and loss of cementitious materials into unwanted areas, it is undesirable to use flowable materials for filling mine shafts or the like.

However, use of substantially non-flowable (zero inches slump) cementitious material is desired for filling underground spaces, such as mine shafts, because the material does not flow away from the area of placement. Therefore, less waste occurs into unwanted areas and fill up volumes are more accurately calculated.

Until now, no method has been provided for plugging underground spaces with substantially non-flowable cementitious material. Thus, there is a need for methods of admixing and placing substantially non-flowable cementitious material into an underground space, such as a mine shaft or the like.

SUMMARY OF THE INVENTION

The present invention provides methods of admixing and placing substantially non-flowable cementitious material into an underground space, such as a mine shaft or the like. The methods meet the needs described above and overcome the shortcomings of the prior art.

As such, a preferred method of admixing and placing substantially non-flowable cementitious material into an underground space comprises: mixing a cement slurry; transferring the cement slurry to a high intensity mixer; introducing an activator to the high intensity mixer; using the high intensity mixer to admix the cement slurry and activator into the substantially non-flowable cementitious material; and pumping the substantially non-flowable cementitious material into the underground space wherein a conduit, pipe, tube, or other delivery means is used for delivering the substantially non-flowable cementitious material from the high intensity mixer to the underground space. The preferred high intensity mixer provides sufficient energy for producing a substantially uniform admixture of cement slurry and activator.

It is, therefore, a general object of the present invention to provide methods of admixing and placing substantially non-flowable cementitious material into an underground space, such as a mine shaft or the like.

A further object of the present invention is the provision of methods for admixing and placing cementitious material into an underground space whereby the material is pumped and placed in a substantially non-flowable state.

Yet, a further object of the present invention is the provision of methods for admixing and placing cementitious material into an underground space wherein the material does not flow away from the area of placement.

Other and further objects, features and advantages of the present invention will be readily apparent to those skilled in the art upon a reading of the description of preferred embodiments which follows when taken in conjunction with the accompanying drawing.

BRIEF DESCRIPTION OF THE DRAWING

The drawing is a diagrammatic illustration in accordance with the preferred embodiment of the invention.

DESCRIPTION OF PREFERRED EMBODIMENTS

As mentioned above, the methods of the present invention can be used in applications requiring a cementitious material to be placed into an underground space, wherein the material does not flow away from the area of placement. Preferred methods are particularly suitable for use in plugging a mine shaft. The mine shaft referred to herein as being plugged can be any underground space having a generally defined area to be filled.

The preferred method, shown in the diagrammatic illustration, basically comprises mixing dry solids and water into a cement slurry using a known mixing system, such as an "RCM/ADC" mixing system commercially available from Halliburton Energy Services of Duncan, Oklahoma. The preferred dry solids include about 95% ASTM Class F fly ash "POZMIX®" cement and about 5% hydraulic cement. It is understood that other ratios and grades of fly ash and hydraulic cement could also be used as well as other cementitious materials in the method of the present invention. Furthermore, when higher quality fly ash (ie. ASTM Class G) is used for the dry solids, less cement and activator are required; thus, providing a more economical cementitious material.

Fresh water is preferably utilized for forming the cement slurry of this invention. The water is included in the composition in an amount from about 2.5 to about 3.8 gallons per 75 pound sack of dry solids.

The cement slurry is pumped from the mixing system to a high intensity mixer, such as that commercially available under part no. 439.00279 from Halliburton Energy Services of Duncan, Okla. A second pump may be used to pump an activator to the high intensity mixer for admixing with the cement slurry. Preferably, the activator is sodium silicate (Grade 40) which is added to the cement slurry (preferably in the range from about 12.5 to about 15 lbs/gal) in the ratio from about 1 to about 3 gallons of the activator per 42 gallons of the cement slurry. Alternatively, the additive may be selected from the group consisting of triethanolamine (TEA), sodium meta-silicate, sodium aluminate, calcium chloride and ammonium chloride.

The high intensity mixing of the cement slurry and activator is essential in providing a substantially uniform consistency of substantially non-flowable cementitious material. Hence, the preferred high intensity mixer provides sufficient energy for producing the substantially uniform admixture of the cement slurry and activator. Moreover, in order to prevent slugging and inconsistencies, it is preferable to mix the cement slurry in isolation before the activator is combined therewith using the high intensity mixer.

The substantially uniform admixture of cementitious material produced in the high intensity mixer can be pumped through a conduit, pipe, tube or other delivery means while in a substantially non-flowable state. Wherefore, the preferred means for delivery transfers the substantially non-flowable cementitious material to the opening of the mine shaft for free-fall placement therein. The cementitious material delivered from the conduit does not flow away from the area of placement, that is, it exhibits substantially zero slump upon placement.

In order to further illustrate the substantially non-flowable cementitious material and methods of the present invention, the following examples are given.

EXAMPLE 1

A substantially non-flowable cementitious material was admixed and pumped containing the components and amounts given in Table I below.

TABLE I

| Component | Amounts |
| --- | --- |
| 95% ASTM Class F fly ash with 5% hydraulic cement | 150 sacks (75 lbs/sack) |
| Water | 2.5 gal/sack |
| Sodium Silicate | 3.0 gals/bbl slurry |

TABLE II

| Test | Results |
| --- | --- |
| Density | 15.7 PPG |
| Yield | 0.8 ft$^3$/sack |

EXAMPLE 2

A ventilation mine shaft was plugged through a four inch (4") vent pipe. The mine shaft configuration and substantially non-flowable cementitious material properties are provided in Tables III and IV below.

TABLE III

| MINE CONFIGURATION | |
| --- | --- |
| Shaft Diameter | 13 ft |
| Depth | 600 ft |
| Approaches | 4 each, at 90° angles 8 ft (w) × 13 ft (h) |

TABLE IV

| MATERIAL PROPERTIES | |
| --- | --- |
| Density (Cement Slurry) (95% fly ash and 5% hydraulic cement) | 15.2 lb/gal |
| Water/Dry Solids | 3 gal/sack (75 lbs/sack) |
| Sodium Silicate (Grade 40) | 12 gal/min |
| Yield | 0.9 ft$^3$/sack |
| Strength | 300 psi in 50 days at 80° F. |
| Slump | 0 inches |
| Pump Time | 13 hours |

Thus, the present invention is well adapted to attain the ends and advantages mentioned as well as those which are inherent therein. While numerous changes may be made by those skilled in the art, such changes are encompassed within the spirit of this invention as defined by the appended claims.

What is claimed is:

1. A method of admixing and placing substantially non-flowable cementitious material into an underground space, comprising the steps of:

mixing a cement slurry;

transferring said cement slurry to a high intensity mixer;

introducing an activator to said high intensity mixer;

using said high intensity mixer to admix said cement slurry and said activator into a substantially non-flowable cementitious material; and pumping the substantially non-flowable cementitious material into the underground space.

2. The method of claim 1, wherein said step of pumping the substantially non-flowable cementitious material includes a conduit for delivering the material from said high intensity mixer to the underground space.

3. The method of claim 1, wherein said activator is combined with said cement slurry in a sufficient amount to produce the substantially non-flowable cementitious material.

4. The method of claim 1, wherein said high intensity mixer provides sufficient energy for producing a substantially uniform admixture of said cement slurry and said activator.

5. The method of claim 1, wherein said cement slurry has a density in the range from about 12.5 to about 15.0 pounds per gallon.

6. The method of claim 1, wherein said activator is combined with said cement slurry in a ratio in the range from about 1 to about 3 gallons of said activator per 42 gallons of said cement slurry.

7. The method of claim 1, wherein said cement slurry includes dry solids consisting essentially of about 95% fly ash and about 5% hydraulic cement.

8. The method of claim 1, wherein said activator is selected from the group consisting of triethanolamine, sodium meta-silicate, sodium aluminate, calcium chloride and ammonium chloride.

9. A method of admixing and placing substantially non-flowable cementitious material into an underground space, comprising the steps of:

mixing a cement slurry;

transferring said cement slurry to a high intensity mixer;

introducing an activator to said high intensity mixer;

using said high intensity mixer to admix said cement slurry and said activator into substantially non-flowable cementitious material, wherein the material is a substantially uniform admixture;

pumping the substantially non-flowable cementitious material into the underground space.

10. The method of claim 9, wherein said step of pumping the substantially non-flowable cementitious material includes a conduit for delivering the material from said high intensity mixer to the underground space.

11. The method of claim 9, wherein said high intensity mixer provides sufficient energy for producing the substantially uniform admixture of said cement slurry and said activator.

12. The method of claim 9, wherein said activator is combined with said cement slurry in a sufficient amount to produce the substantially non-flowable cementitious material.

13. The method of claim 9, wherein said activator is combined with said cement slurry in a ratio in the range from about 1 to about 3 gallons of said activator per 42 gallons of said cement slurry.

14. The method of claim 9, wherein said cement slurry includes dry solids consisting essentially of about 95% fly ash and about 5% hydraulic cement.

15. The method of claim 9, wherein said activator is selected from the group consisting of triethanolamine, sodium meta-silicate, sodium aluminate, calcium chloride and ammonium chloride.

16. A method of admixing and placing substantially non-flowable cementitious material into an underground space, comprising the steps of:

mixing a cement slurry;

transferring said cement slurry to a high intensity mixer;

introducing an activator to said high intensity mixer;

using said high intensity mixer to admix said cement slurry and said activator into a substantially non-flowable cementitious material, wherein said high intensity mixer provides sufficient energy for producing a substantially uniform admixture of said cement slurry and said activator; and pumping the substantially non-flowable cementitious material into the underground space.

17. The method of claim 16, wherein said step of pumping the substantially non-flowable cementitious material includes a conduit for delivering the material from said high intensity mixer to the underground space.

18. The method of claim 16, wherein said activator is combined with said cement slurry in a sufficient amount to produce the substantially non-flowable cementitious material.

19. The method of claim 16, wherein said activator is combined with said cement slurry in a ratio in the range from about 1 to about 3 gallons of said activator per 42 gallons of said cement slurry.

20. The method of claim 16, wherein said cement slurry includes dry solids consisting essentially of about 95% fly ash and about 5% hydraulic cement.

* * * * *